(12) United States Patent
Hoyer et al.

(10) Patent No.: US 11,574,093 B2
(45) Date of Patent: Feb. 7, 2023

(54) NEURAL REPARAMETERIZATION FOR OPTIMIZATION OF PHYSICAL DESIGNS

(71) Applicant: Google LLC, Mountain View, CA (US)

(72) Inventors: Stephan Owen Steele Hoyer, San Francisco, CA (US); Jascha Narain Sohl-Dickstein, San Francisco, CA (US); Samuel James Greydanus, Corvallia, OR (US)

(73) Assignee: GOOGLE LLC, Mountain View, CA (US)

( * ) Notice: Subject to any disclaimer, the term of this patent is extended or adjusted under 35 U.S.C. 154(b) by 283 days.

(21) Appl. No.: 16/722,587

(22) Filed: Dec. 20, 2019

(65) Prior Publication Data

US 2021/0192111 A1    Jun. 24, 2021

(51) Int. Cl.
| | | |
|---|---|---|
| *G06F 30/27* | (2020.01) | |
| *G06F 30/23* | (2020.01) | |
| *G06F 111/04* | (2020.01) | |
| *G06F 30/20* | (2020.01) | |

(52) U.S. Cl.
CPC .............. *G06F 30/27* (2020.01); *G06F 30/23* (2020.01); *G06F 30/20* (2020.01); *G06F 2111/04* (2020.01)

(58) Field of Classification Search
CPC ...... G06F 30/27; G06F 30/23; G06F 2111/04; G06F 30/20
See application file for complete search history.

(56) References Cited

U.S. PATENT DOCUMENTS

| | | | | |
|---|---|---|---|---|
| 6,606,612 | B1 * | 8/2003 | Rai | G06F 30/15 706/15 |
| 7,369,976 | B1 * | 5/2008 | Nakajima | G06F 30/15 703/6 |
| 8,803,673 | B2 * | 8/2014 | Carney | G01M 17/024 73/146 |
| 2012/0036491 | A1 * | 2/2012 | Ramji | G06F 30/392 716/122 |

(Continued)

OTHER PUBLICATIONS

H. Zhu, J. Hale, E. Zhou, "Optimizing Conditional Value-At-Risk via Gradient-Based Adabtive Stochastic Search" pp. 726-737, 2016 IEEE (Year: 2016).*

(Continued)

*Primary Examiner* — Kibrom K Gebresilassie
(74) *Attorney, Agent, or Firm* — Dority & Manning, P.A.

(57) ABSTRACT

The present disclosure is directed to a system for reparameterizing of a neural network to optimize structural designs. The system can obtain data descriptive of a design space for a physical design problem. The design space is parameterized by a first set of parameters. The system can reparameterize the design space with a machine-learned model that comprises a second set of parameters. For a plurality of iterations, the system can provide an input to the machine-learned model to produce a proposed solution. The system can apply one or more design constraints to the solution to create a constrained solution. The system can generate a physical outcome associated with the constrained solution using a physical model. The system can evaluate the physical outcome using an objective function and update at least one of the second set of parameters. After the plurality of iterations, the system can output a solution.

18 Claims, 5 Drawing Sheets

(56) References Cited

U.S. PATENT DOCUMENTS

| | | | | | |
|---|---|---|---|---|---|
| 2014/0214370 | A1* | 7/2014 | Olhofer | ............... | G06F 30/23 |
| | | | | | 703/1 |
| 2018/0365554 | A1* | 12/2018 | van den Oord | ......... | G06N 3/04 |
| 2019/0325092 | A1* | 10/2019 | Ren | ......................... | G06N 3/08 |
| 2020/0026807 | A1* | 1/2020 | Sha | ......................... | G03F 7/705 |
| 2020/0096978 | A1* | 3/2020 | Baker | ............... | G05B 19/4097 |
| 2020/0147889 | A1* | 5/2020 | Dheeradhada | ......... | B29C 64/10 |
| 2020/0209832 | A1* | 7/2020 | Behandish | ............ | B33Y 50/00 |
| 2020/0320175 | A1* | 10/2020 | Roberts | ................... | G06F 30/23 |
| 2021/0192111 | A1* | 6/2021 | Hoyer | ..................... | G06F 30/23 |
| 2021/0271793 | A1* | 9/2021 | Pivovar | ................... | G06N 7/08 |
| 2022/0074994 | A1* | 3/2022 | Senn | ...................... | G06N 7/005 |

OTHER PUBLICATIONS

Alter, "Structural Topology Optimization Using a Convolutional Neural Network", Deep Learning, 2008, 6 pages.

Andreassen et al, "Efficient Topology Optimization in MATLAB Using 88 Lines of Code", Structural and Multidisciplinary Optimization, Nov. 2011, 15 pages.

Azadi et al, "Multi-Content GAN for Few-Shot Font Style Transfer", arXiv:1712v1, Dec. 1, 2017, 16 pages.

Banga et al, "3D Topology Optimization Using Convolutional Neural Networks", arXiv:1808v3, Aug. 22, 2018, 21 pages.

Bendsøe, "Optimization of Structural Topology, Shape, and Material", Springer, Berlin, Heidelberg, 1995.

Chen et al, "Algorithm 887: CHOLMOD, Supernodal Sparse Cholesky Factorization and Update/Downdate", Transactions on Mathematical Software, vol. 35, No. 3, Article 22, Oct. 2008, 14 pages.

Dittmer et al, "Regularization by Architecture: A Deep Prior Approach for Inverse Problems", Journal of Mathematical Imaging and Vision, Oct. 2019, 15 pages.

Errico, "What is an Adjoint Model?", Bulletin of the American Meteorological Society, vol. 78, No. 11, 1997, pp. 2577-2592.

Farrell et al, "Automated Derivation of the Adjoint of High-Level Transient Finite Element Programs", arXiv:1204v1, Apr. 25, 2012, 26 pages.

Gain et al, "Topology Optimization Using Polytopes", Computer Methods Applied Mechanics and Engineering, vol. 293, 2015, pp. 411-430.

Gatys et al, "Image Style Transfer Using Convolutional Neural Networks", Conference on Computer Vision and Pattern Recognition, pp. 2414-2423.

Giles et al, "An Introduction to the Adjoint Approach to Design", Flow, Turbulence and Combustion, vol. 65, pp. 393-415.

Griewank et al, "Reduced Functions, Gradients and Hessians from Fixed-Point Iterations for State Equations", Numerical Algorithms, vol. 30, pp. 113-139.

Jiang et al, "Global Optimization of Dielectric Metasurfaces Using a Physics-Driven Neural Network", arXiv:1906v2, Jul. 5, 2019, 20 pages.

Jiang et al, "Free-Form Diffractive Metagrating Design Based on Generative Adversarial Networks", American Chemical Society, Nano, Jul. 2019, 7 pages.

Johnson, "The NLopt Nonlinear-Optimization Package", https://nlopt.readthedocs.io/en/latest/, retrieved on Apr. 16, 2020, 3 pages.

Krog et al, "Topology Optimisation of Aircraft Wing Box Ribs", The Altair Technology Conference, 2004, 16 pages.

Liu et al, "On the Limited Memory BFGS Method for Large Scale Optimization", Mathematical Programming, vol. 45, 1989, pp. 503-528.

Maclaurin et al, "Autograd: Effortless Gradients in Numpy", International Conference on Machine Learning, Jul. 6-11, 2015, 3 pages.

Nocedal, "Updating Quasi-Newton Matrices with Limited Storage", Mathematics of Computation, vol. 35, No. 151, Jul. 1980, pp. 773-782.

Plessix et al, "A Review of the Adjoint-State Method for Computing the Gradient of a Functional with Geophysical Applications", Geophysical Journal International, vol. 167, pp. 495-503.

Sigmund, "A 99 Line Topology Optimization Code Written in Matlab", Structural and Multidisciplinary Optimization, Apr. 2001, pp. 120-127.

Sigmund et al, "Numerical Instabilities in Topology Optimization: A Survey on Procedures Dealing with Checkerboards, Mesh-Dependencies and Local Minima", Structural and Multidisciplinary Optimization, vol. 16, Aug. 1998, 8 pages.

Sokół, "A 99 Line Code for Discretized Michell Truss Optimization Written in Mathematica", Structural and Multidisciplinary Optimization, vol. 43, Feb. 2011, 10 pages.

Sosnovik et al, "Neural Networks for Topology Optimization", arXiv:1709v1, Sep. 27, 2017, 13 pages.

Svanberg et al, "The Method of Moving Asymptotes—A New Method for Structural Optimization".

Ulyanov et al, "Deep Image Prior", arXiv:1711v3, Apr. 5, 2018, 10 pages.

Valdez et al, "Topology Optimization Benchmarks in 2D: Results for Minimum Compliance and Minimum Volume in Planar Stress Problems", Computational Methods of Engineering, 2017, pp. 803-829.

Zhu et al, "Topology Optimization in Aircraft and Aerospace Structures Design", Computational Methods in Engineering, Apr. 2015, 28 pages.

Zhu et al, "Physics-Constrained Deep Learning for High-Dimensional Surrogate Modeling and Uncertainty Quantification without Labeled Data", arXiv:1901v1, Jan. 18, 2019, 51 pages.

\* cited by examiner

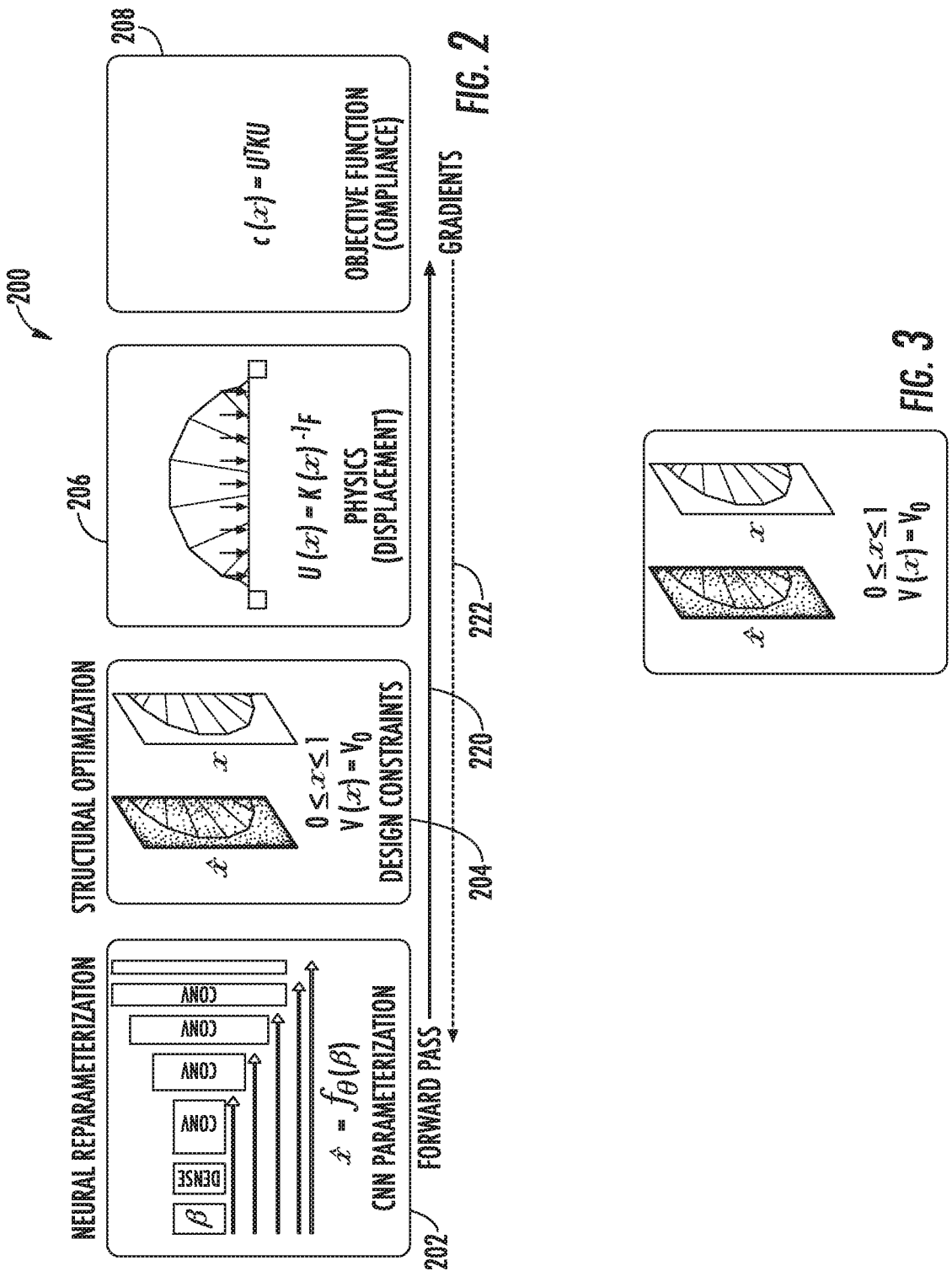

NEURAL REPARAMETERIZATION FOR OPTIMIZATION OF PHYSICAL DESIGNS

FIELD

The present disclosure relates generally to machine-learned models. More particularly, the present disclosure relates the reparameterization of a design space for a physical design using a machine-learned model.

BACKGROUND

There are numerous instances of physical designs which can be designed within a design space. Example physical structures which can be designed within a design space include a bridge, an airplane wing, an engine component, an optical device, a circuit topology or design, and many others. Generally, a design space can be established for any physical structure.

More specifically, the design space for these physical designs is often parameterized by a set of parameters. This set of parameters defines the possible options, variables, configurations, values, etc. for potential solutions for the design.

In some computerized instances, after a potential design has been created within the design space, the potential design can be computationally evaluated such as, for example, through application of a physical model (also known as a physics model).

Thus, in one specific example, a design space for a load-bearing structure such as a bridge can take the form of a discretized grid, where each discrete location within the grid has one or more parameters which can be modified to control an amount, type, density, or other characteristic(s) or material located at such discrete location. Once a particular solution has been proposed, the potential solution can be evaluated using a physical model. For example, the physical model can determine an amount of displacement that the bridge would experience when subjected to a load.

However, identifying an optimal variant of a physical structure directly within the corresponding design space can be challenging. Specifically, the quality of solutions produced for a design problem depends heavily upon how the design space is parameterized. In addition, in a manual approach, it may take many instances of trial and error to identify the optimal solution. Furthermore, the set of parameters of the design space provides only a limited opportunity for application of more automated optimization techniques.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system comprising one or more computing devices, data descriptive of a design space for a physical design problem, wherein the design space is parameterized by a first set of parameters. The method can include reparameterizing, by the computing system, the design space for the physical design problem with a machine-learned model that comprises a second set of parameters, wherein reparameterizing, by the computing system, the design space comprises configuring the machine-learned model to generate proposed solutions for the physical design problem associated with the design space. The method can include, for each of a plurality of iterations providing, by the computing system, an input to the machine-learned model comprising the second set of parameters to produce a proposed solution, applying, by the computing system, one or more design constraints to the solution to create a constrained solution within the design space, wherein the constrained solution is expressed according to the first set of parameters of the design space, generating, by the computing system and using a physical model, a physical outcome associated with the constrained solution, evaluating, by the computing system, the physical outcome using an objective function; and updating, by the computing system, at least one of the second set of parameters based on a gradient of the objective function. The method can include, after the plurality of iterations, outputting, by the computing system, an optimized version of the machine-learned model that is trained to create an optimal physical design for the physical design problem.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which:

FIG. 2 depicts a flow diagram illustrating an example method for neural reparameterization for structural optimization according to example aspects of the present disclosure.

FIG. 3 depicts an example structural solution before and after the design constraints are applied according to example aspects of the present disclosure.

DETAILED DESCRIPTION

Figure 1:
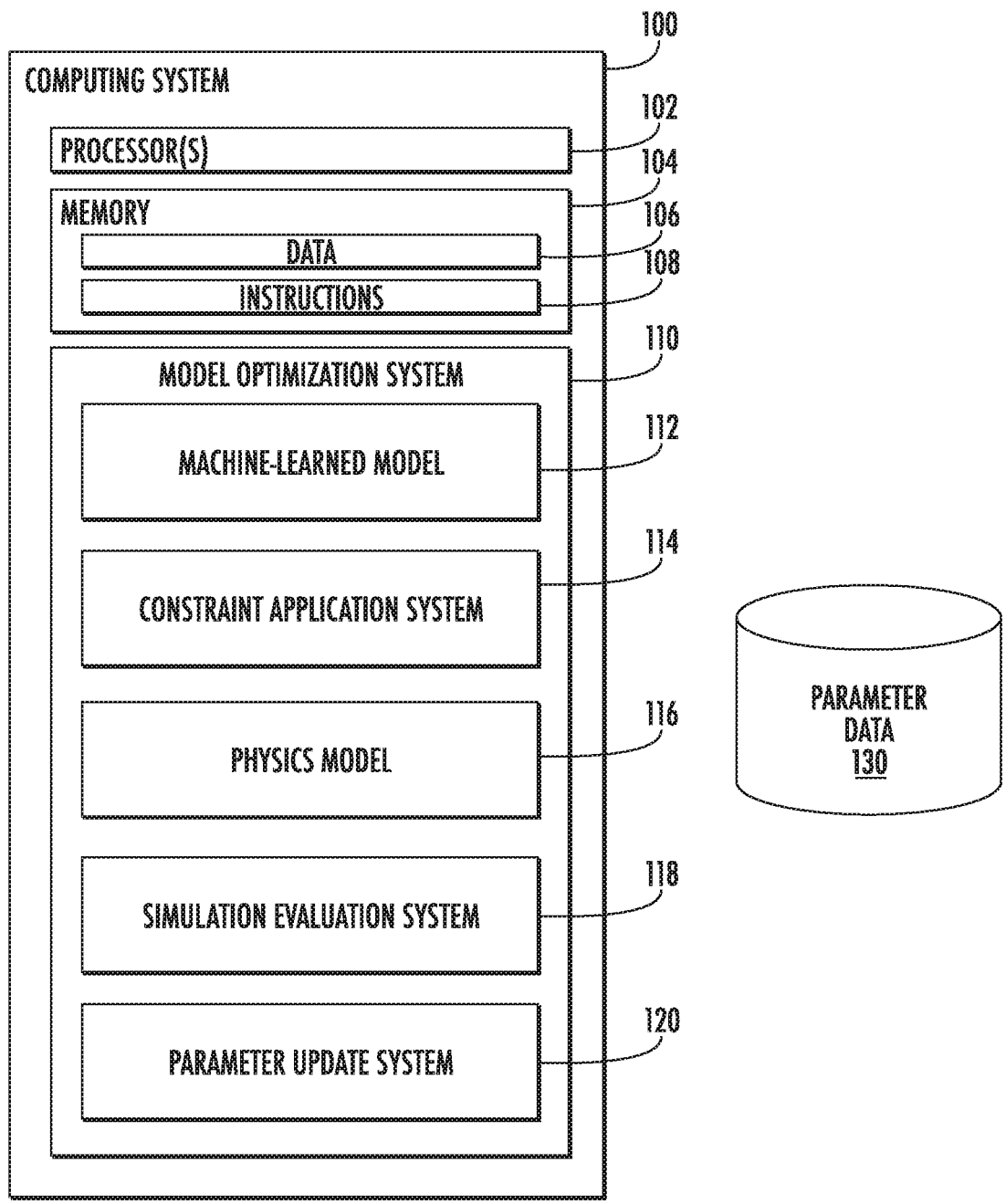
FIG. 1 depicts an example neural reparameterization system according to example aspects of the present disclosure.

Generally, the present disclosure is directed to a system for creating optimized physical designs by reparameterizing a design space using a machine-learned model such as, for example, a neural network. Specifically, a design space for a physical design problem can be parameterized by a first set of parameters. Aspects of the present disclosure propose to reparameterize the design space for the physical design problem with a machine-learned model that comprises a second set of parameters. In particular, the machine-learned model can be configured to generate proposed solutions for the physical design problem associated with the design space. The proposed solutions offered by the machine-learned model can be evaluated using a physical model and an objective function. The second set of parameters of the machine-learned model can be iteratively modified (e.g., through backpropagation of the gradient of the objective function through both the physical model and then the machine-learned model) to optimize the objective function. In such fashion, the machine-learned model can be trained to produce an optimal solution for the physical design problem. Thus, aspects of the present disclosure are directed to reparameterizing the design space of a physical design problem with a machine-learned model and then learning an optimal version of the machine-learned model for the specific physical design problem, rather than attempting to directly optimize within the design space. In such fashion, the application of more powerful automated learning algorithms can be enabled, thereby allowing greater expressivity to be achieved and an optimal solution for the specific physical design problem to be obtained.

In particular, a neural network can be used to perform a variety of tasks. One such task is to identify an optimal design for a particular physical design problem, such as, for example, an optimal structure for a physical structure (e.g., a bridge, an airplane wing, an optical device, a circuit topology or design, etc.). In this example, a network optimization system can optimize the parameters of a neural network rather than attempting to directly optimize the solution within the design space. The parameters of a neural network can include, but are not limited to, the weights of nodes in the neural network, the inputs to the neural network, and outputs produced by any stage of the system. Thus, when a neural network is created to solve a particular structural optimization problem, the neural network has a second set of parameters as its initial state. Using this second set of parameters, the neural network can generate a first proposed solution to the structural problem. A proposed solution can be modified through application of one or more design constraints. One example of a design constraint can include a total amount of material to be used in the design. Other design constraints can include normalizing the values in a given proposed solution to be within a certain range. Once the proposed solution has been constrained to comply with any requirements of the design space, a physical model can be used to test the constrained solution. For example, a constrained solution can be subjected to tests using a physics model that measures the displacement of the structure when under simulated physical forces. Once the displacement has been determined, the displacement can be evaluated by an objective function such as, for example, a compliance function. A gradient associated with the objective function can be determined and backpropagated along the processing pipeline. The second set of parameters can then be updated based on the gradient such that the future solutions generated by the neural network better meet the criteria by which the physical designs are evaluated.

More particularly, a network optimization system can allow a neural network to be optimized for a particular physical design problem. For example, physical design problems may include the design of a bridge, support structure, building, or other structure. In some design problems, a total amount of materials can be fixed.

In some examples, a computing system is used to perform model optimization. The system can include one or more processors, memory, and a model optimization system. In some examples, the memory can include data used to perform one or more processes and instructions that describe how those processes can be performed.

In some examples, the model optimization system includes a machine-learned model, a constraint application system, a physics model, a simulation evaluation system, and a parameter update system. In some examples, the computing system is also connected to a database of parameter data wherein the parameter data describes one or more parameter values for parameters of the machine-learned model.

In some examples, the machine-learned model is a convolutional neural network or another neural network that can produce a physical design based on input. The convolutional neural network can receive input. For example, the input can include a noise vector that is learned as part of the model itself. In some examples, the machine-learned model can access one or more parameters from the parameter data database to use as the parameters for the machine learning model. In some examples, the machine learning model output is one or more solutions to the design problem for which the machine learning model is being trained.

Once a solution has been generated by the machine learning model, a constraint application system then produces a constrained version of the solution by applying one or more constraints to the solution. For example, one of the constraints can include a requirement detailing the maximum amount of material to be used in the solution. In this example, the constraint application system can calculate the total amount of material used in the current solution and, if the total material used exceeds the maximum total, the constraint application system can remove material from one or more locations in the solution. Thus, the constraint application system can constrain the solution such that the total amount of material used in the solution is less than or equal to the maximum allowed by the physical design problem. Another example constraint includes a specific range of values for which the physical design must meet. In this example, applying the constraint can include normalizing the proposed solution so that its values fall within the specific range (e.g., 0 to 1).

In some examples, the constraint application system (or another component) can perform gradient descent on the input to the constraint application system (the output of the neural network before constraint application). Doing so can result in recovering the original physical design optimization problem.

In some examples, once the constraint application system has generated a constrained solution, the physics model can use one or more physics modeling techniques to determine a physical outcome for the constrained solution. In some examples, the determined physical outcome represents the amount of displacement that the solution exhibits when placed in a physical model. More generally, any physical characteristics of the physical design can be evaluated using a physics model, thereby determining a physical outcome for the constrained solution.

Once a physics model has produced a displacement amount (or another physical outcome) for the proposed solution, the simulation evaluation system can use an objective function to evaluate the physical outcome associated with the physical model. For example, if the displacement is the result of the downward force of gravity on the physical model, the physical outcome can be represented as an equation (or other mathematical description) that represents or describes the results of the simulated physical forces on the proposed physical design in the solution. More generally, an objective function can be any function that evaluates a desirability, effectiveness, etc. of the physical outcome of the simulated solution.

Thus, in some examples, the simulation evaluation system can evaluate the simulation (or its results) by an objective function that evaluates the degree to which the solution meets one or more criteria. In some examples, the objective function measures the degree to which the proposed solution meets the criteria for which the solution was designed, which may be referred to as compliance. In the example wherein the solution is a structure, the one or more criteria can include minimizing the degree to which the object is displaced when load bearing is simulated by a physics model.

A gradient of the objective function can be determined and used to update the second set of parameters of the machine-learned model. More particularly, in some examples, the physical model can be differentiated or a differentiation can be estimated. For example, various adjoint models which are differentiable are available and can be used.

For example, the parameter update system can use the gradient determined from the objective function to update one or more parameters in the parameter database. This process can be repeated until the parameters have been optimized within predetermined criteria. For example, the predetermined criteria may represent a total number of iterations. In other examples, the predetermined criteria can represent the degree to which the parameters are adjusted falling below a threshold. For example, if an iteration-over-iteration change in the parameter values or the gradient falls below a threshold, the optimization can be concluded.

In some examples, the parameter data can include, but is not limited to information describing the specific neural network including the number of nodes, the number of layers, the weights of each node, and the connections between nodes. In some examples, the parameter data can also include one or more characteristics of the input data to the neural network.

In more detail, the machine-learned model can be implemented as a variety of different neural networks. In one specific example, the machine-learned model can consist of a dense layer separated into 32 image channels, followed by five repetitions of tanh nonlinearity, 2× bilinear resize (for the middle three layers), global normalization by subtracting the mean and dividing by the standard deviation, a 2D convolution layer, and a learned bias over all elements and/or channels. Example implementations of the convolutional layers can use 5×5 kernels and can have 128, 64, 32, 16, and 1 channels, respectively In some examples, the network optimization system can include a machine-learned model. The machine-learned model can be trained to receive a set of input data, and, in response to the receiving input data, generate a proposed solution for a particular design problem (e.g., a physical design problem).

In some examples, the machine-learned model can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

The machine-learned model can be optimized using various training or learning techniques, such as, for example, backward propagation of errors. For example, a loss function can be backpropagated through the model(s) to update one or more parameters of the model(s) (e.g., based on a gradient of the loss function). Various loss functions can be used such as mean squared error, likelihood loss, cross-entropy loss, hinge loss, and/or various other loss functions. Gradient descent techniques can be used to iteratively update the parameters over several training iterations. In some implementations, performing backward propagation of errors can include performing truncated backpropagation through time. Generalization techniques (e.g., weight decays, dropouts, etc.) can be performed to improve the generalization capability of the models being trained.

In some examples, the network optimization system provides input to a machine-learned model associated with the second set of parameters to produce a solution, wherein the solution and parameters are associated with a physical design problem. In some examples, the machine-learned model is a convolutional neural network. In some examples, the solution can include a regular square grid. In some examples, the regular square grid includes a plurality of linear finite elements within a discretized domain.

In some examples, each respective finite element in the plurality of linear finite elements represents a density of material at the location represented by the respective linear finite element. The network optimization system can apply one or more design constraints to create a constrained solution within a design space. In some examples, the design constraints represent a numerical range into which the second set of parameters are normalized.

In some examples, the network optimization system generates, using a physical model, a physical outcome associated with the constrained solution. The network optimization system evaluates the physical outcome using an objective function. In some examples, the objective function can be differentiable. In other examples, a derivative of the objective function can be approximated.

The network optimization system updates the second set of parameters based on a gradient of the objective function. In some examples, the input to the machine-learned model can be treated as being included in the second set of parameters and is updated based on the gradient of the objective function. In some examples, the objective function is a scalar loss function. In some examples, updating the second set of parameters based on a gradient of the objective function can comprise performing gradient descent on the second set of parameters.

In some examples, the systems and methods described herein can be applied to separately solve multiple different physical design problems. In such examples, each distinct physical design problem can be associated with a distinct machine-learned model.

In some examples, the neural network optimization system can access data on past parameterization for a plurality of other physical design problems. The neural network optimization system can use this data on past parameterization to optimize the initial set of parameters for each new machine-learned model. By optimizing the initial set of parameters, the neural network optimization system can allow for faster and more accurate convergence to an optimal solution for a particular physical design problem.

Similarly, a neural network optimization system can determine, when receiving a new physical design problem, whether any models have been trained for similar physical design problems. If the neural network optimization system identifies a past similar design problem, the neural network optimization system can re-use (e.g., as an initial starting point) trained parameters from the past similar design problem. For example, the neural network optimization system can optimize for one bridge task or an ensemble of bridge tasks and reuse parameters for a novel bridge design task.

Although the above description has focused mostly on using reparameterization to train models for solving physical design problems, the above approach can be used for any various problem type which features a solution space which can be reparameterized and evaluated. As one example problem type, the described reparameterization approach can be used in designing optic or photonic systems. Similarly, the above process can be used to train computer-learned models for designing semiconductor chips.

Furthermore, the above process can be used to produce solutions for inverse problems, which are problems that involve inverting a physical model to estimate underlying parameters from measurements. For example, such tasks can include medical imaging tasks, sub-surface imaging tasks (e.g., hunting for oil, minerals, water), weather forecasting tasks, optic tasks, acoustic tasks, remote sensing tasks, and astronomy tasks, among others. Conceptually, the process for solving these tasks can be extremely similar to structural optimization tasks, except that instead of being optimized to maximize some metrics of interest, the simulation is optimized to match experimental measurements.

In addition, the above process can be used to solve equations. Thus, instead of using neural networks to parameterize designs used as inputs into simulations, a trained model could parametrize the outputs of simulations, (e.g., the solution to a set of physics equations).

The systems and methods described herein provide a number of technical effects and benefits. More particularly, the systems and methods of the present disclosure provide improved techniques for generating optimal physical design solutions using neural reparameterization. For instance, a machine-learned model (and its associated processes) can produce a solution to a physical design problem and then the optimization system can tune the parameters involved to result in a better overall physical design. Specifically, neural reparameterization as disclosed herein results in better results (e.g., simpler, more robust designs) than comparable techniques that may be used. Given the same initialization values for a plurality of different processes, and starting each process from an untrained state, physical designs using the neural reparameterization have a lower error rate and simpler designs than other methods currently in use for generating physical designs. Having a reduced error rate and simpler designs results in a reduction in the time and cost needed to build the designs while increasing the safety of those designs, thereby providing savings of computing resources such as processor usage, memory usage, network bandwidth, etc. As such, the disclosed system can significantly improve the process for designing structures such that the designs are simple and cost-effective while remaining safe.

With reference to the figures, example embodiments of the present disclosure will be discussed in further detail.

FIG. 1 depicts an example neural reparameterization system according to example aspects of the present disclosure. As illustrated, FIG. 1 includes a computing system 100 that can be used to perform model optimization. The computing system 100 can include one or more processor(s) 102, memory 104, and a model optimization system 110.

The one or more processor(s) 102 can be any suitable processing device, such as a microprocessor, microcontroller, integrated circuit, or other suitable processing device. The memory 104 can include any suitable computing system or media, including, but not limited to, non-transitory computer-readable media, RAM, ROM, hard drives, flash drives, or other memory devices. The memory 104 can store information accessible by the one or more processor(s) 102, including instructions 106 that can be executed by the one or more processor(s) 102 and data 108 needed to execute the instructions. The instructions 106 can be any set of instructions that when executed by the one or more processor(s) 102, cause the one or more processor(s) 102 to provide desired functionality.

In particular, in some devices, memory 104 can store instructions for implementing the model optimization system 110. The computing system 100 can implement the model optimization system 110 to execute aspects of the present disclosure, including the reparameterization of a machine-learned model to enable the machine-learned model to perform one or more tasks (e.g., generating physical designs).

It will be appreciated that the term "system" can refer to specialized hardware, computer logic that executes on a more general processor, or some combination thereof. Thus, a system can be implemented in hardware, application specific circuits, firmware and/or software controlling a general-purpose processor. In one embodiment, the system can be implemented as program code files stored on the storage device, loaded into memory, and executed by a processor or can be provided from computer program products, for example computer executable instructions, that are stored in a tangible computer-readable storage medium such as RAM, hard disk or optical or magnetic media.

Memory 104 can also include data 106 that can be retrieved, manipulated, created, or stored by the one or more processor(s) 102. In some example embodiments, such data can be accessed and used as input to the model optimization system 110. In some examples, the memory 104 can include data used to perform one or more processes and instructions that describe how those processes can be performed.

In some examples the model optimization system 110 includes a machine-learned model 112, a constraint application system 114, a physics model 116, a simulation evaluation system 118, and a parameter update system 120. In some examples, the computing system 100 can be connected to a database of parameter data 130 wherein the parameter data describes one or more parameters for the machine-learned model 110.

In some examples, the machine-learned model 110 is a convolutional neural network or another neural network that can produce a physical design based on input. The convolutional neural network can receive input, where the input includes data describing the specifications of the physical design that needs to be created. In some examples, the machine-learned model can access one or more parameters from the parameter data database 130 to use as the parameters for the machine-learned model 112. The initial parameters can be called the second set of parameters. In some examples, the machine-learned model 112 output is one or more solutions to the design problem for which the machine learned model 112 is being trained.

Once a solution has been generated by the machine learning model 112, a constraint application system 114 can produce an optimized version of the solution by applying one or more constraints to the solution. For example, one of the constraints can include a requirement detailing the maximum amount of material to be used in the solution. In this example, the constraint application system 114 can calculate the total amount of material used in the current solution and, if the total material used exceeds the maximum total, the constraint application system 114 can remove material from one or more locations in the solution. Thus, the constraint application system 114 can optimize the solution such that the total amount of material used in the solution is less than or equal to the maximum allowed by the physical design problem.

In some examples, the constraint application system 114 (or another component) can perform gradient descent on the input to the constraint application system 114 (the output of the neural network before reparameterization). Doing so can result in recovering the original physical design optimization problem.

In some examples, once the constraint application system 114 has generated a constrained solution, the physics model 116 can use one or more physics modeling techniques to determine a physical outcome for the constrained solution. In some examples, the determined physical outcome represents the amount of displacement that the solution exhibits when placed in a physical model.

Once a physics model 116 has produced a displacement amount (or another physical outcome) for the proposed solution, the simulation evaluation system 118 can use an objective function to evaluate the displacement associated with the physical model. For example, if the displacement is the result of the downward force of gravity on the physical model, the physical outcome can be represented as an equation (or other mathematical description) that represents or describes the results of the simulated physical forces on the proposed physical design in the solution.

In some examples, the simulation evaluation system 118 can then evaluate the simulation (or its results) by an objective function that evaluates the degree to which the constrained solution meets one or more criteria. In some examples, the objective function measures the degree to which the proposed solution meets the criteria for which the solution was designed, which may be referred to as compliance. In the example wherein the solution is a physical design, the one or more criteria can include minimizing the degree to which the object is displaced when simulated by a physics model 116.

In some examples, the simulation evaluation system 118 can evaluate the solution by differentiating (either a first-order derivative or a second-order derivative) the equation (or mathematical model) that represents the degree to which the solution is displaced when under physical forces. As such, the simulation evaluation system 118 can produce the best results when the equation that represents the physical outcome can be differentiated or a differentiation can be estimated. Using the differential of the equation that represents the physical outcome, the simulation evaluation system 118 can generate a gradient that allows the model optimization system 110 to adjust the parameters of the neural network to, over a series of iterations, approach the optimal solution.

For example, the parameter update system 120 can use the gradient determined from the objective function to update one or more parameters in the parameter database. This process can be repeated until the parameters have been optimized within predetermined criteria. For example, the preset criteria may represent a total number of iterations. In other examples, the preset criteria can represent the degree to which the parameters are adjusted falling below a threshold.

In some examples, the parameter data can include, but is not limited to information describing the specific neural network including the number of nodes, the number of layers, the weights of each node, and the connections between nodes. In some examples, the parameter data can also include one or more characteristics of the input data to the neural network.

FIG. 2 depicts a flow diagram illustrating an example method for neural reparameterization for structural optimization according to example aspects of the present disclosure. A network optimization system 200 for generating efficient physical designs (or performing other tasks) can include a machine-learned model 210 that has a set of parameters associated with it, a constraint system 212, a physics model 214, and a compliance determination system 216.

In some examples, the machine-learned model 202 can be implemented as a variety of different neural networks. In some examples, the machine-learned model can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. In some implementations, an input (represented graphically in FIG. 2 by β) can be considered as part of the parameters of the model to be optimized.

In one specific example, the machine-learned model 202 can consist of a dense layer separated into 32 image channels, followed by five repetitions of tanh nonlinearity, 2× bilinear resize (for the middle three layers), global normalization by subtracting the mean and dividing by the standard deviation, a 2D convolution layer, and a learned bias over all elements and/or channels.

In the specifically illustrated example, the solution produced by the machine-learned model 202 (e.g., a neural network) can be a grid of discrete values, each discrete value representing the amount or concentration of a material in the physical area represented by the discrete value in the grid. For example, if the designed structure is a bridge, the solution can represent the shape and structure of the bridge from a particular angle represented on a grid, with each portion of the grid being associated with an amount of material/density of material for that particular portion of the grid. In some examples, the solution produced by the machine-learned model 202 can include more than one grid so that the solution is represented from more than one perspective.

In some examples, a particular task may include the goal of generating a design for a structure, given constraints such as conservation of volume (e.g., the total material remaining constant). In some examples, the physical density $\tilde{x}_{ij}$ at grid element (or pixel) (i,j) is computed by applying a cone-filter with radius two on the input densities $x_{ij}$. Then, letting $K(\tilde{x})$ be the global stiffness matrix, $U(K,F)$ the displacement vector, F the vector of applied forces, and $V(\tilde{x})$ the total volume, we can write the optimization objective as: $\min_x$: $c(x)=U^T KU$; such that: $KU=F$; $V(x)=V_0$; and $0 \leq x_{ij} \leq 1 \forall (i,j)$. In some examples, $U=K^{-1}F$ is linearly solved using a sparse Cholesky factorization.

In some examples, the constraints can include volume and density constraints. In some examples, these constraints can be enforced by mapping unconstrained logits $\hat{x}$ into valid densities x with a constrained sigmoid transformation:

$$x_{ij}=1/(1+\exp[-\hat{\tilde{x}}_{ij}-b(\hat{x},V_0)]); \text{ such that: } V(x)=V_0.$$

where $b(\hat{x}, V_0)$ is solved via binary search on the volume constraint. In the backwards pass, one can differentiate through the transformation at the optimal point using implicit differentiation.

In some examples, the machine-learned model 202 can be trained to receive a set of input data, and, in response to the receiving input data, generating a solution for a particular design problem (e.g., a physical design problem).

In some examples, the network optimization system 200 can provide input to the machine-learned model 202 associated with the second set of parameters to produce a solution. In some examples, the solution and parameters can be associated with a particular physical design problem. In some examples, the machine-learned model 202 can a convolutional neural network. In some examples, the solution can include a regular square grid. In some examples, the regular square grid includes a plurality of linear finite elements within a discretized domain.

In some examples, each respective finite element in the plurality of linear finite elements can represent a density of material at the location represented by the respective linear finite element. The network optimization system 200 can, using the constraint system 204, apply one or more design constraints to create a constrained solution within a design space. In some examples, the design constraints represent a numerical range into which the second set of parameters are normalized.

In some examples, the network optimization system 200 can generate, using the physical model 206, a physical outcome associated with the constrained solution. The network optimization system 200 can evaluate, using the compliance determination system 216, the physical outcome using an objective function. In some examples, the objective function can be differentiable. In other examples, a derivative of the objective function can be approximated.

The network optimization system 200 can update the second set of parameters based on a gradient of the objective function. In some examples, the input to the machine-learned model can be treated as being included in the second set of parameters and is updated based on the gradient of the objective function. In some examples, each distinct physical design problem can be associated with a distinct machine-learned model. In some examples, the objective function is a scalar loss function. In some examples, updating the second set of parameters based on a gradient of the objective function can comprise performing gradient descent on the second set of parameters.

In some examples, the physical outcome can measure the displacement of the constrained solution when used as input to the physical model.

FIG. 3 depicts an example structural solution before and after the design constraints are applied according to example aspects of the present disclosure. In this example, the machine-learned model (e.g., machine-learned model 202 of FIG. 2) can generate initial output 302 based on the inputs to the machine-learned model (e.g., machine-learned model 202 of FIG. 2) and the parameters associated with the machine-learned model (e.g., machine-learned model 202 of FIG. 2).

As seen in the current example, the initial solution 302 ($\hat{x}$) can include a grid of values, each point in the grid including an indication of the amount of material to be included at that point of the design. However, at least some of the points in the grid include material at very low concentrations that is unconnected to other sections of the physical design. To produce a clean design, one or more constraints can be applied to the initial solution 302.

In some examples, the constraints that are applied can include normalization of the values at each point in the grid, such that all the values are between 0 and 1. The constraints can include a requirement that the total volume of material used in the design matches a goal volume. Thus, if the total amount of material exceeds the goal volume, the constraints can reduce the values in one or more points in the grid. In some examples, grid points that have a value below a threshold value or are unconnected to other points in the grid system can have the values associated with those grid points reduced to zero.

As a result of these constraints, the constraint system (e.g., system 204 in FIG. 2) can produce a constrained solution (x). The resulting constrained solution can have much of the low density, unconnected grid points totally removed, resulting in a much cleaner design.

Figure 4:
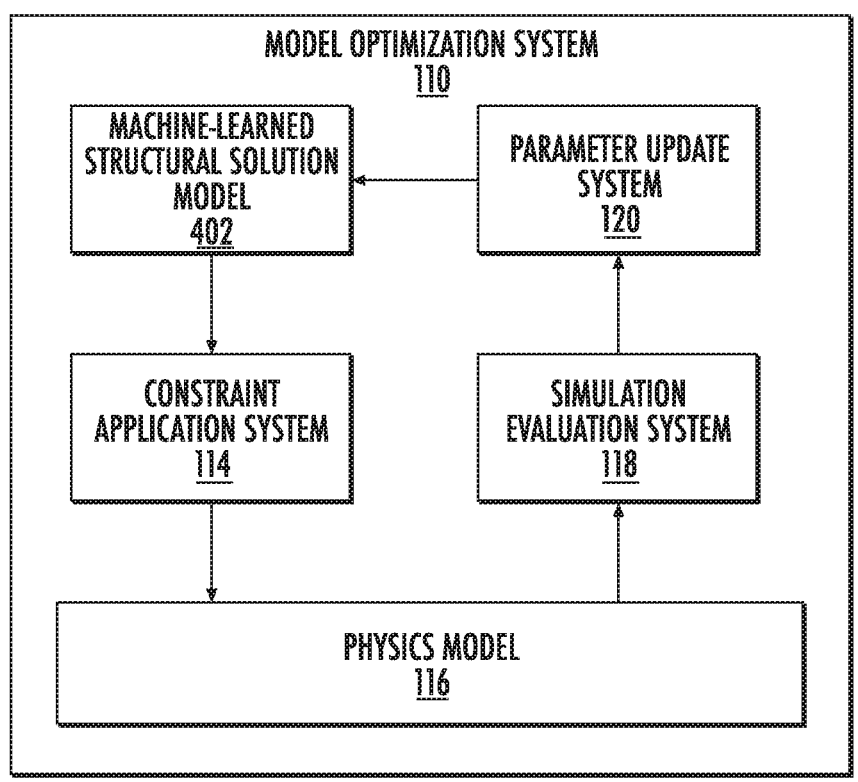
FIG. 4 depicts a block diagram representation of a neural reparameterization system according to example aspects of the present disclosure.

FIG. 4 depicts a block diagram representation of a model optimization system 110 according to example aspects of the present disclosure. In some examples, the model optimization system 110 can include a machine learned structural solution model 402, a constraint application system 114, a physics model 116, a simulation evaluation system 118, and a parameter update system 120.

In some examples, a machine-learned structural solution model 402 can receive input describing a particular structural problem before which design is needed. The machine-learned structural solution model 402 can have a set of initial parameters associated with the model. As noted above, parameters can include, but are not limited to, the number of nodes in a neural network, the number of layers in the neural network, initial weights associated to each node in the neural network, one or more input values, and any other values associated with annual network or other machine learning model.

In some examples, the machine learned structural solution model 402 can output a physical design based on the inputs to the model and the parameters of the model. It should be noted, that in some examples a particular machine-learned structural solution model 402 can be trained to produce designs for a single physical design problem and not to be a general physical design solution engine. Thus, for each new physical design problem, a new machine-learning structural solution model 402 can be trained.

In some examples, the output solution can be provided as input to a constraint application system 114. The initial solution can be processed by the constraint application system 114 to apply one or more constraints to the initial solution and produce a constraint solution. As noted above with respect to FIG. 3. The constraints can include a normalization of values in our grid comma and preserving the total amount of material used in the design such that it does not exceed a maximum out of material.

The constraint application system 114 can generate a constrained solution. The constrained solution can then be provided to a physics model 116 for evaluation. The physical model 116 can evaluate the degree to which the constrained solution is displaced when subject to physics forces. In some examples, the degree to which the constrained solution is displaced can be represented by a particular formula.

Once the physics model 116 has evaluated a representation of the degree to which the designed solution will be displaced, a simulation evaluation system 118 can then generate representation of that displacement. The representation of the displacement can be used by the parameter update system 120 to generate a gradient that is used to update the set of parameters. In some examples, the parameter update system 120 can use the L-BFGS optimization method rather than the more standard stochastic gradient descent methods because at least some optimization problems are not stochastic.

In some examples, once the parameter update system 120 updates the set of parameters of the machined-learned structural solution model 402, the machine-learned structural solution model 402 can produce another solution based on the updated parameters. In some examples, the above process can be repeated until the resulting solution meets one or more criteria (e.g., the amount that the parameters are updated falls below a threshold value or a total number of iterations).

Figure 5:
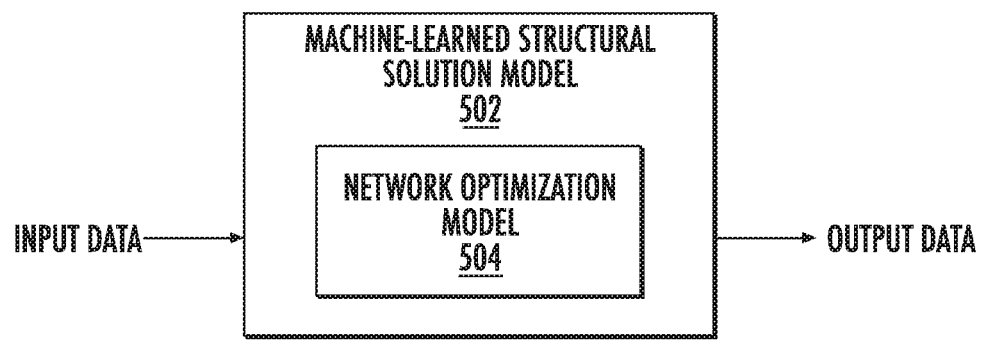
FIG. 5 depicts a block diagram of a multi-step model for neural reparameterization according to example embodiments of the present disclosure.

FIG. 5 depicts a block diagram of a model for neural reparameterization according to example embodiments of the present disclosure. A machine-learned structural solution model 502 can include a network optimization model 504. The machine-learned structural solution model 502 can be trained to receive a set of input data associated with a physical design problem, and, in response to the receiving input data, provide output data that describes a physical design for the structural problem. Thus, in some implementations, the machine-learned structural solution model 502 can be operable to generate a solution to a physical design problem.

In some examples, the network optimization model 504 can, based on one or more evaluations of previously produced solutions, alter the parameters of the machine-learned structural solution model 502. In some examples, the machine-learned structural solution model 502 can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

Although the machine-learned structural solution model 502 and/or network optimization model 504 are described as using particular techniques above, either model can be trained based on training data using various other training or learning techniques, such as, for example, backward propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over several training iterations. In some implementations, performing backward propagation of errors can include performing truncated backpropagation through time. Generalization techniques (e.g., weight decays, dropouts, etc.) can be performed to improve the generalization capability of the models being trained.

Figure 6:
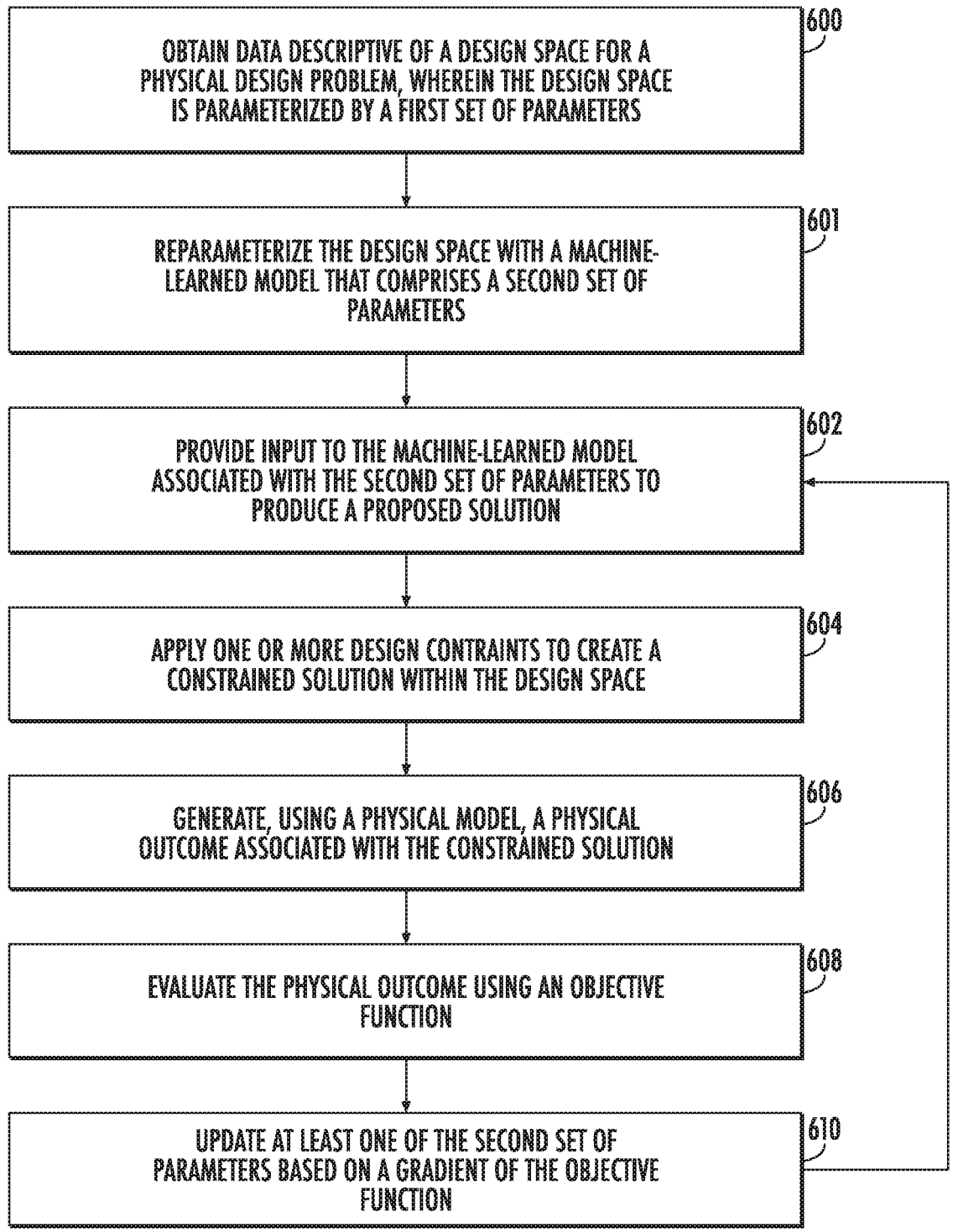
FIG. 6 depict a flowchart illustrating an example method for neural reparameterization according to example embodiments of the present disclosure.

FIG. 6 depict a flowchart illustrating an example method for neural reparameterization according to example embodiments of the present disclosure. In some examples, the method includes a neural reparameterization system that, at 600, obtains data descriptive of a design space for a physical design problem. The design space is parameterized by a first set of parameters.

At 601, the system can reparameterize the design space with a machine-learned model that comprises a second set of parameters.

At 602, the system can provide an input to a machine-learned model associated with a second set of parameters to produce a proposed solution, wherein proposed solution is associated with the physical design problem. In some examples, the machine-learned model can be a convolutional neural network.

In some examples, the solution includes a regular square grid. The regular square grid can include a plurality of linear finite elements within a discretized domain. In some examples, each respective linear finite element in the plurality of linear finite elements can represent a density of material at a location represented by the respective linear finite element.

In some examples, the neural reparameterization system applies, at 604, one or more design constraints to the solution to create a constrained solution within a design space. In some examples, the design constraints can represent a numerical range into which the values of the are normalized.

In some examples, the neural reparameterization system can generate, at 606, using a physical model, a physical outcome associated with the constrained solution. The neural reparameterization system can evaluate, at 608, the physical outcome using an objective function. In some examples, the objective function can be differentiable. In other examples, a derivative of the objective function can be approximated. In some examples, the physical outcome can measure the displacement of the constrained solution when used as input to the physical model.

In some examples, the neural reparameterization system can update, at 610, the second set of parameters based on a gradient of the objective function. In some examples, the objective function can be a scalar loss function. In some examples, the input to the machine-learned model is included in the second set of parameters and is updated based on the gradient of the objective function.

In some examples, updating the second set of parameters based on a gradient of the objective function can comprise performing a gradient descent on a second set of parameters. In some examples, each distinct physical design problem can be associated with a distinct machine-learned model.

After 610, the method can return to 602 so that steps 602, 604, 606, 608, and 610 are iteratively performed. After iterative performances of such steps, the machine-learned model can have values for the second set of parameters that produce an optimal solution for the physical design problem. For example, iterations can be performed until one or more stopping criteria are met. The stopping criteria can be any number of different criteria including, as examples, a loop counter reaching a predefined maximum, an iteration over iteration change in parameter adjustments falling below a threshold, an iteration over iteration change in gradient values falling below a threshold, a gradient of the loss function being below a threshold value, and/or various other criteria.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method to reparameterize a physical design problem using machine learning, the method comprising:
   obtaining, by a computing system comprising one or more computing devices, data descriptive of a design space for a physical design problem, wherein the design space is parameterized by a first set of parameters;
   reparameterizing, by the computing system, the design space for the physical design problem with a machine-learned model that comprises a second set of parameters, wherein reparameterizing, by the computing system, the design space comprises configuring the machine-learned model to generate proposed solutions for the physical design problem associated with the design space;
   for each of a plurality of iterations:
      providing, by the computing system, an input to the machine-learned model comprising the second set of parameters to produce a proposed solution;
      applying, by the computing system, one or more design constraints to the proposed solution to create a constrained solution within the design space, wherein the constrained solution is expressed according to the first set of parameters of the design space, wherein applying, by the computing system, one or more design constraints comprises:
         determining, by the computing system, whether a total material amount used in the proposed solution exceeds a maximum material amount;
         in response to determining that the total material amount used in the proposed solution exceeds the maximum material amount, altering, by the computing system, the proposed solution to reduce the total material amount used;
      generating, by the computing system and using a physical model, a physical outcome associated with the constrained solution;
      evaluating, by the computing system, the physical outcome using an objective function;
      updating, by the computing system, at least one of the second set of parameters based on a gradient of the objective function; and
      updating, by the computing system, the input to the machine-learned model based on the gradient of the objective function;
   after the plurality of iterations, outputting, by the computing system, an optimized version of the machine-learned model that is trained to create an optimal physical design for the physical design problem, and
   creating, by the computing system using the optimized version of the machine-learned model, an optimal physical design for the physical design problem.

2. The computer-implemented method of claim 1, wherein a derivative of the objective function with respect to the physical model is directly computable or estimatable.

3. The computer-implemented method of claim 1, wherein the design space comprises a grid.

4. The computer-implemented method of claim 3, wherein the grid includes a plurality of linear finite elements within a discretized domain.

5. The computer-implemented method of claim 4, wherein each respective linear finite element in the plurality of linear finite elements represents a density of material at a location represented by the respective linear finite element.

6. The computer-implemented method of claim 1, wherein the design constraints represent a numerical range into which respective values of the proposed solution are normalized.

7. The computer-implemented method of claim 1, wherein the machine-learned model is a convolutional neural network.

8. The computer-implemented method of claim 1, wherein the one or more design constraints are differentiable.

9. The computer-implemented method of claim 1, further comprising performing the method of claim 1 for multiple distinct physical design problems, wherein each distinct physical design problem is associated with a distinct machine-learned model.

10. The computer-implemented method of claim 1, wherein the objective function is a scalar loss function.

11. The computer-implemented method of claim 1, wherein updating the second set of parameters based on a gradient of the objective function comprises: performing gradient descent on the second set of parameters.

12. The computer-implemented method of claim 1, wherein the physical outcome measures a displacement of the constrained solution when used as input to the physical model.

13. A system for generating a solution to a physical design problem, the system comprising:
   a computing system comprising one or more processors and a non-transitory computer-readable memory;
   wherein the non-transitory computer-readable memory stores instructions that, when executed by the one or more processors, cause the computing system to perform operations, the operations comprising:
      providing an input to a machine-learned model that reparameterizes a design space associated with the physical design problem, wherein the design space is parameterized by a first set of parameters, wherein the machine-learned model comprises a second set of parameters, and wherein the machine-learned model is configured to generate a proposed solution for the physical design problem;
      applying one or more design constraints to the proposed solution to create a constrained solution within a design space, wherein applying, by the computing system, one or more design constraints comprises:
         determining, by the computing system, whether a total material amount used in the proposed solution exceeds a maximum material amount;
         in response to determining that the total material amount used in the proposed solution exceeds the maximum material amount, altering, by the computing system, the proposed solution to reduce the total material amount used;
      generating, using a physical model, a physical outcome associated with the constrained solution;
      evaluating the physical outcome using an objective function;
      updating the second set of parameters based on a gradient of the objective function to generate an optimal version of the machine-learned model configured to generate an optimal solution to the physical design problem;
      updating the input to the machine-learned model based on the gradient of the objective function;

outputting an optimized version of the machine-learned model that is trained to create an optimal physical design for the physical design problem, and creating, using the optimized version of the machine-learned model, an optimal physical design for the physical design problem.

14. The system of claim 13, wherein the instructions cause the computing system to perform the operations for multiple distinct physical design problems, and wherein each distinct physical design problem is associated with a distinct machine-learned model.

15. The system of claim 13, wherein the objective function is a scalar loss function.

16. A non-transitory computer-readable medium storing instruction that, when executed by one or more computing devices, cause the one or more computing devices to perform operations, the operations comprising:

providing an input to a machine-learned model that reparameterizes a design space associated with the physical design problem, wherein the design space is parameterized by a first set of parameters, wherein the machine-learned model comprises a second set of parameters, and wherein the machine-learned model is configured to generate a proposed solution for the physical design problem;

applying one or more design constraints to the proposed solution to create a constrained solution within a design space, wherein applying, by the computing system, one or more design constraints comprises:

determining, by the computing system, whether a total material amount used in the proposed solution exceeds a maximum material amount;

in response to determining that the total material amount used in the proposed solution exceeds the maximum material amount, altering, by the computing system, the proposed solution to reduce the total material amount used;

generating, using a physical model, a physical outcome associated with the constrained solution;

evaluating the physical outcome using an objective function;

updating the second set of parameters based on a gradient of the objective function to generate an optimal version of the machine-learned model configured to generate an optimal solution to the physical design problem;

updating the input to the machine-learned model based on the gradient of the objective function;

outputting an optimized version of the machine-learned model that is trained to create an optimal physical design for the physical design problem, and creating, using the optimized version of the machine-learned model, an optimal physical design for the physical design problem.

17. The non-transitory computer-readable medium of claim 16, wherein the instructions cause the computing system to perform the operations for multiple distinct physical design problems, and wherein each distinct physical design problem is associated with a distinct machine-learned model.

18. The computer-implemented method of claim 1, wherein the input to the machine-learned model comprises a noise vector.

* * * * *